UNITED STATES PATENT OFFICE.

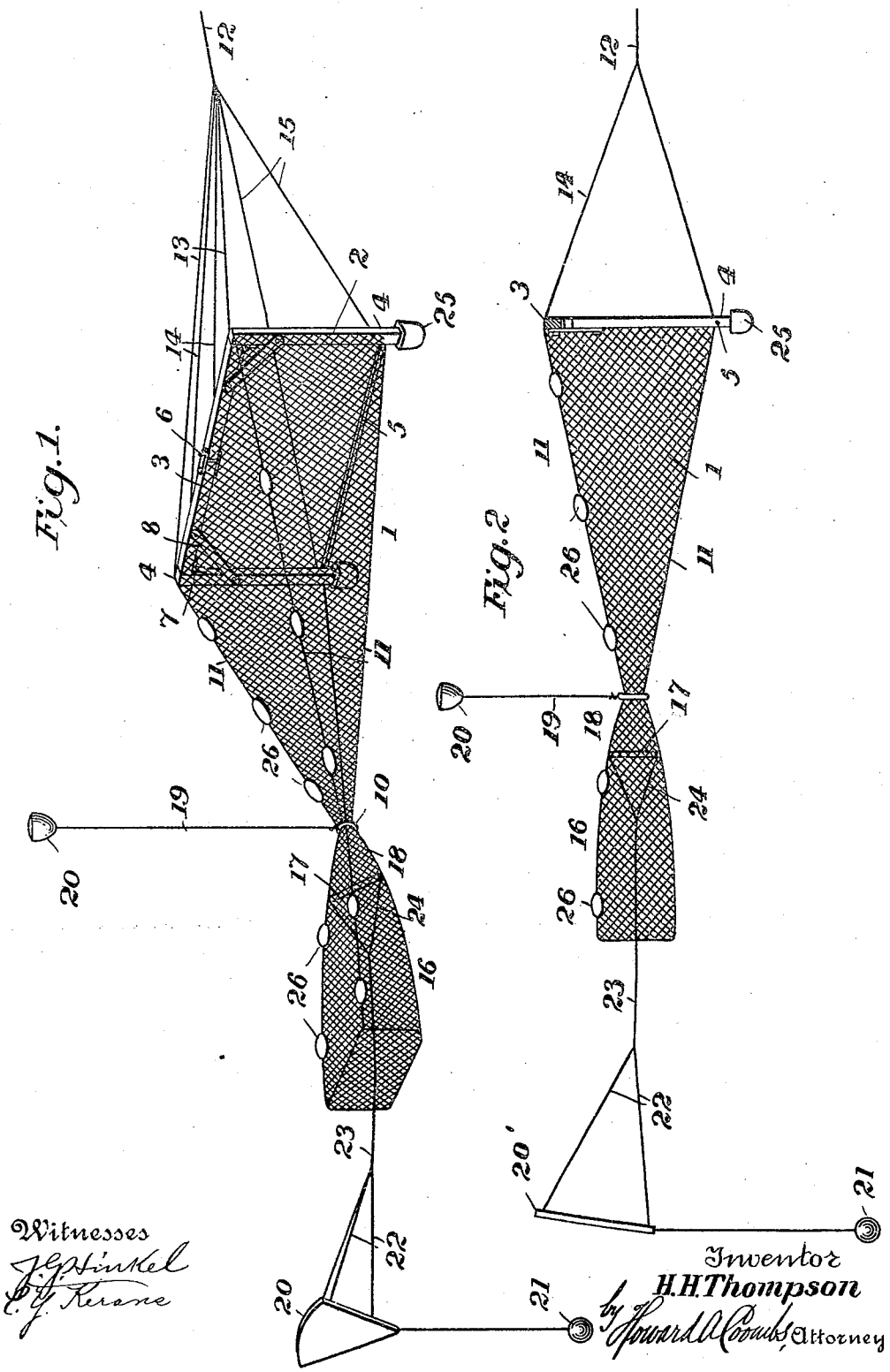

HIRAM H. THOMPSON, OF WASHINGTON, DISTRICT OF COLUMBIA.

FISH-DREDGE.

953,069.  Specification of Letters Patent.  Patented Mar. 29, 1910.

Application filed September 8, 1909. Serial No. 516,751.

*To all whom it may concern:*

Be it known that I, HIRAM H. THOMPSON, a citizen of the United States, and a resident of Washington, District of Columbia, have invented certain new and useful Improvements in Fish-Dredges, of which the following is a specification.

My invention relates to an improved means for catching fish, which I designate by the name of fish dredge, it being designed for fishing in relatively deep waters, the dredge being towed by a vessel or boat.

The net or dredge is so constructed that it will sink close to the bottom but means are provided for preventing the net itself from dragging along the bottom, said means and the towing means being adjustable so that the nearness of the net to the bottom can be varied as desired.

The construction and method of use of my improved fish dredge will now be described in connection with the accompanying drawing, in which:—

Figure 1 is a perspective view of the dredge as it would appear in use, and Fig. 2 is a central vertical section of the same.

The dredge consists essentially of the following parts: first, a funnel-shaped net, secured at its mouth to a rigid, rectangular frame-work and terminating at its other end in a relatively small aperture; second, a bag-net or trap, which communicates with the funnel net through the said aperture; and third, a drag or level adjuster, attached by ropes behind the bag-net.

In the drawing, 1 represents the funnel net, the front end of the same being secured to the frame 2, consisting of a horizontal upper member 3 and vertical uprights 4, 4, the lower ends of the latter being tied together by a strong wire 5, which is slightly shorter than the top piece 3, whereby the spring of the side pieces or uprights maintain said wire under tension. As this framework is of considerable size, for example, it may be 21 or 22 feet in width, and 10 or 11 feet in height, I construct it so that it may be folded up for convenience in transportation. Thus the top member 3 is made in two sections, hinged together in the middle at 6, and the side pieces or uprights 4 are hinged at 7, 7, to the top piece 3, removable braces 8, 8, serving to keep said uprights and top member at right angles to each other.

The mouth of the net 1 is secured along the members 3 and 4 and also to the wire 5, said net tapering from the frame-work rearwardly for a distance of, for example, 17 or 18 feet, its small end being secured to a ring 10 from which ropes 11, 11, on which the net is strung, run to the frame-work 3, 4.

The tow line 12 is connected to the frame by a bridle consisting of ropes 13, 13, running to the upper corners of the frame, ropes 14, 14, running to intermediate points on the top member 3, and ropes 15, 15, running to points at a little distance from the bottom of the side pieces or uprights 4, 4, all these ropes running together and being connected to the tow line 12. The length of these ropes, constituting the bridle, is adjustable, so that the frame-work may be caused to maintain a substantially vertical position in different depths of water and for different lengths of tow line.

The bag-net or trap is shown at 16, its front end being attached, as before stated, to the ring 10 and its rear end being closed. Within this net, at a short distance from its front end, I place a transverse bar 17, which I call a spreader, the same serving to hold the bag extended, the ends of said spreader being secured to ropes 18, running from the ring 10, and to the rear of the net, which is strung thereon. To the ring 10 is secured, by a rope 19, a float 20, the purpose of which is to supply means whereby the funnel net and frame-work can be drawn backwardly in case the latter encounters an obstacle in its forward movement. Behind the bag net 16 is attached the drag or level adjuster 20. The same consists of a triangular or kite-shaped board, from the small end of which is supported a weight or sinker 21, and the face of which is connected by a bridle 22 to a rope 23, passing centrally through the bag-net and secured by the bridle 24 to the spreader 17. The length of the ropes 22 is so chosen that the drag 20' inclines forwardly, more or less, when the dredge is being towed, whereby the drag has a tendency to lift on the rear end of the bag net 16 and keep it from dragging on the bottom. By suitable adjustment of the length of the rope supporting the weight 21, the drag can be caused to maintain the net at any desired distance above the bottom. When the weight 21 strikes the bottom and drags along the same, it will cause the upper edge of the drag 20' to tip forwardly, whereby the drag presents an inclined surface to the water and will rise in the same, lifting the weight again off the bottom and, of course, raising the rear end of the net. Thus the net is kept at a substantially constant height above the bottom. (To the bottoms of the uprights 4, 4 are secured weights or sinkers 25, 25, to cause the frame-work to sink.)

The frame-work being extended and the nets and drag properly connected, the whole is lowered into the water, the bridle, consisting of the ropes 13, 14, and 15, being of such a length, that when the net is near the bottom of the water and is being towed by a boat or boats, the frame-work will stand substantially vertical, and the bridle 22 of the drag 20', being adjusted so that the bag-net 16 is held off the bottom. The fish entering the funnel net, pass through the ring 10 into the bag-net, from which they will be unable to escape. Both nets are provided with suitable floats 26, of wood or cork, and the float 20 is attached by its rope 19 to the ring 10. The wire 5 enables the framework to be easily folded up and also presents less obstruction to possible obstacles or irregularities on the bottom of the water than would a solid frame-member.

In waters where the width will permit it, I attach two or more of my improved dredges, as described above, side-by-side, securing the uprights 4 of one dredge to the corresponding uprights of two other dredges, one on either side, for example.

It is thought that the method of use of my invention will now be clear to those familiar with devices of this nature.

Having thus described my invention, what I claim is:

1. A fish dredge, comprising in combination, a rectangular frame-work, adapted to be attached to a tow line, a funnel net secured to said frame-work, a bag-net communicating with the rear end of said funnel net, a triangular board secured by its corners to said nets, and a weight suspended from the lower corner of said board, whereby when said weight strikes the bottom, said board will be tipped forwardly and lift the rear ends of the nets.

2. In a device of the class described, a drag or level adjuster comprising a substantially triangular board having a weight secured below the same and ropes running from points near its three apices and connected to a tow line, whereby when said weight drags on the bottom, said board will be inclined forwardly and rise in the water.

Signed at Washington, D. C., this fourth day of September, 1909.

HIRAM H. THOMPSON.

Witnesses:
HOWARD A. COOMBS,
M. A. SEARLES.